United States Patent Office 3,555,101
Patented Jan. 12, 1971

3,555,101
PROCESS FOR THE PRODUCTION OF $\alpha,\alpha,\alpha',\alpha'$-TETRA-METHYL-XYLYLENE-DICARBINOLS
Hans-Josef Buysch, Krefeld, Heinrich Krimm, Krefeld-Bockum, and Hermann Schnell, Krefeld-Urdingen, Germany, assignors to Farbenfabriken Bayer Aktiengesellschaft, Leverkusen, Germany, a corporation of Germany
No Drawing. Continuation of application Ser. No. 571,995, Aug. 12, 1966. This application Dec. 10, 1968, Ser. No. 785,036
Claims priority, application Germany, Sept. 8, 1965, 47,125
Int. Cl. C07c 29/00
U.S. Cl. 260—618      4 Claims

ABSTRACT OF THE DISCLOSURE

The process involves passing molecular oxygen through an anhydrous liquid mixture containing diisopropyl-benzene and 1–5% by weight, based on the weight of diisopropyl-benzene present, of finely divided anhydrous alkali metal hydroxide at temperatures between 100 and 150° C. This oxidation procedure may be carried out in the presence of an anhydrous inert diluent. The anhydrous liquid mixture containing finely dispersed anhydrous alkali metal hydroxide may be prepared by azeotropic distillation of a solution containing concentrated aqueous alkali metal hydroxide, diisopropyl-benzene and an inert diluent.

This application is a continuation of application Ser. No. 571,995, filed Aug. 12, 1966, and now abandoned.

The present invention relates to a process for the production of $\alpha,\alpha,\alpha',\alpha'$-tetramethyl-xylylene-dicarbinols by the oxidation of diisopropyl-benzenes with molecular oxygen.

The hitherto known way of producing the said carbinols leads via the corresponding hydroperoxides which are converted into the carbinols either by reduction with reducing agents, such as sodium hydrogen sulphite, or by decomposition with a strong alkali. The prerequisite is in both cases the production of a corresponding $\alpha,\alpha,\alpha',\alpha'$-tetramethyl-xylylene-dihydroperoxide, which involves substantial difficulties, because the oxidation yields, in addition to the desired hydroperoxides, a number of by-products, such as alcohols, ketones, carboxylic acids, phenols and other substances of undefined structure formed by secondary reactions.

When the attempt is made to obviate these secondary reactions by applying lower temperatures, the velocity of oxidation decreases so strongly that the process becomes technically meaningless. If, on the other hand, the formation of carboxylic acids which decompose the hydroperoxide already formed, is successfully suppressed by careful control of the degree of acidity, the reaction must be interrupted when comparatively low yields are obtained, since otherwise the thermal decomposition of the hydroperoxides would become too important as their concentration increases. In either case a mixture of mono- and dihydroperoxides is obtained, which is due to incomplete oxidation and can only be worked up by cumbersome technical devices.

Working with hydroperoxides, moreover, necessitates elaborate and expensive safety measures because of the risk of explosion at higher concentrations.

According to another process the carbinols are directly obtained. This process is carried out, starting from diisopropylbenzene, at 80° C. with compressed oxygen in the presence of soluble heavy metal catalysts and dilute aqueous alkali or alkali metal carbonate solutions. The oxidation, however, does not proceed smoothly. Substantial amounts of derivatives of acetophenone and benzoic acid are obtained as by-products some of which can be separated only by cumbersome methods. The process is therefore unsuitable for a continuous operation.

It has now been found that, surprisingly, $\alpha,\alpha,\alpha',\alpha'$-tetramethyl-xylylene-dicarbinols can be produced without a substantial formation of by-products from diisopropyl-benzenes by oxidation with air or molecular oxygen in a quite simple manner by oxidising the diisopropyl-benzenes in a liquid phase at temperatures between 100 and 150° C. in the presence of a finely divided anhydrous alkali metal hydroxide in an amount of 1–5%, referred to the diisopropyl-benzene.

Oxidation catalysts are not necessary in this case.

Compared with the known methods mentioned above, the process according to the invention has the following advantages:

The dicarbinols are formed from the diisopropyl-benzenes in a one-pot reaction. The concentration of hydroperoxide in the reaction mixture is sufficiently low that the risk of explosion is limited to a minimum and special safety measures are not necessary. The velocity of oxidation is sufficiently high that the oxygen pressure need not be increased above one atmosphere. The addition of heavy metal salts to increase the velocity of oxidation is unnecessary so that the by-products which are formed to a great extent by catalysed radical decomposition of the hydroperoxides do not occur. Isolation and purification of the dicarbinols can be carried out in a simple manner by customary methods. The dicarbinols so obtained are free from hydroperoxide and have a sharp melting point.

Starting materials for the process are o-, m- and p-diisopropyl-benzenes and mixtures of these compounds.

The starting materials may be used undiluted, but the use of a solvent is generally advisable. Inert media are suitable, such as chlorobenzene, dichlorobenzene, bromobenzene, diphenyl, chlorotoluene, bromotoluene, nitrobenzene and chloronaphthalene. If desired, the oxidation can also be carried out in solvents boiling at lower temperatures, such as benzene. In this case, however, the process must be carried out under increased pressure to attain the required temperature.

Suitable alkali metal hydroxides are lithium, sodium, potassium, rubidium and caesium hydroxides.

It has been found that an especially fine dispersion of the added alkali advantageously affects the oxidation. For example, dry alkali which has been ground in the diisopropyl-benzene or in an inert solvent, gives good results. Very finely dispersed alkali is obtained in a simpler manner by adding the necessary amount of alkali in a highly concentrated aqueous solution (20–50%) to the oxidation mixture and removing the water by azeotropic distillation with vigorous stirring or with the blowing through of air or nitrogen. Removal of the water is necessary in order that the temperature of the oxidation mixture can be kept above 100° C., that the decomposition of the hydroperoxides intermediarily formed to give carbinols proceeds smoothly and the formation of by-products is prevented.

In order to obtain the dicarbinols free from hydroperoxides and to keep the concentration of hydroperoxides in the oxidation mixture as low as possible, the reaction temperature must be at least 100° C., expediently in the range from 110° C. to 135° C. Temperatures above 150° C. are not recommended, since in this case the thermal decomposition of the hydroperoxides may lead to secondary reactions.

Isolation of the dicarbinols can be carried out after cooling of the reaction mixture by filtering off the crystallised oxidation product with suction, removing the components which are not completely converted by means of a suitable solvent, such as petroleum, ether, benzene, toluene, cyclohexane and chlorobenzene, and removing the alkali by washing with water. Colorless dicarbinols with a sharp melting point are obtained.

The aqueous alkali solution can be recycled to the process after separation of small amounts of organic impurities and reconcentration. Since unilaterally oxidised dicarbinols, i.e., those oxidised only on one isopropyl group, are further oxidised under these conditions, the residue of the organic wash solution resulting from the isolation of the dicarbinols can also be recycled to the process. The process can therefore be carried out in a continuous manner without any difficulty.

The yields of pure dicarbinols are about 93–95% of theory, referred to the diisopropyl-benzenes. After working up, the very small amounts of by-products are present in the aqueous wash solution.

The $\alpha,\alpha,\alpha',\alpha'$-tetramethyl-xylene-dicarbinols are valuable intermediate products for the production of synthetic resins, particularly of polyesters.

The following examples are given for the purpose of illustrating the invention.

EXAMPLE 1

A mixture of 450 g. p-diisopropyl-benzene, 550 g. bromobenzene and 15.0 ml. of a 50% aqueous sodium hydroxide solution (corresponding to 11.2 g. sodium hydroxide), i.e., 2.5% sodium hydroxide, referred to diisopropyl-benzene, is gassed, after azeotropic removal of the water, through a frit at 115–130° C. for a total of 25 hours with about 10 litres oxygen per hour. At intervals of about 6 hours, the oxidation is interrupted, the solid oxidation product filtered off with suction after cooling, washed with benzene and water and dried. The wash benzene is distilled off and the residue obtained is returned to the oxidation mixture, the alkali removed by washing is replaced and the oxidation continued. A total of 423.0 g. $\alpha,\alpha,\alpha',\alpha'$-tetramethyl-p-xylylene-dicarbinol (melting point 139–142° C.) are obtained, i.e., 79% of theory. A residue of 75.2 g. $\alpha,\alpha$-dimethyl-p-isopropyl-benzyl alcohol (boiling point 83–86° C./0.7 mm. Hg) is obtained from the mother liquor by distillation. If this is used in a subsequent oxidation, the yield of dicarbinol rises to 93% of theory.

EXAMPLE 2

A mixture of 450 g. m-diisopropyl-benzene and 550 g. bromobenzene is oxidised in the presence of azeotropically dehydrated sodium hydroxide as in Example 1. The reaction is interrupted every 7 hours and the $\alpha,\alpha,\alpha'\alpha'$-tetramethyl-m-xylylene-dicarbinol isolated. The residue of the organic wash solution is each time returned to the oxidation mixture. After a total of 55 hours there are obtained 419 g. $\alpha,\alpha,\alpha',\alpha'$-tetramethyl-m-xylylene-dicarbinol (melting point 130–135° C.) i.e. 78% of theory. Distillation of the mother liquor yields 81.0 g. $\alpha,\alpha$-dimethyl-m-isopropyl-benzyl alcohol. If this is used in a subsequent oxidation mixture, the yield of dicarbinol rises to 93% of theory.

EXAMPLE 3

A mixture of 450 g. p-diisopropyl-benzene, 550 g. bromobenzene and 15.0 ml. of a 50% aqueous sodium hydroxide solution is oxidised, after azeotropic dehydration, as described in Example 1. Isolation of the dicarbinol is started after about 6 hours by separating each time part of the oxidation mixture, from which the crystallised dicarbinol is obtained, after cooling, by filtering off with suction and washing with benzene and water, as a colourless product with a sharp melting point. The p-diisopropyl-benzene and alkali are added to the oxidation mixture as and when they are withdrawn. The residue of the organic wash solution from the washing of the dicarbinol is continuously recycled to the oxidation process. After a total of 66 hours, 1326 g. $\alpha,\alpha,\alpha',\alpha'$-tetramethyl-p-xylylene-dicarbinol (melting point 139–142° C. are obtained from 1165 g. p-diisopropyl-benzene. The yield of dicarbinol thus amounts to 95% of theory.

What is claimed is:

1. A process for producing $\alpha,\alpha,\alpha',\alpha'$-tetramethyl-xylylene-dicarbinol which comprises passing molecular oxygen through an anhydrous liquid phase mixture containing diisopropyl-benzene and 1–5% by weight, based on the weight of said diisopropyl-benzene, of finely divided anhydrous alkali metal hydroxide at a temperature between 100 and 150° C., periodically interrupting the oxidation and cooling the reaction mixture, filtering the cooled reaction mixture to obtain a solid oxidation product and mother liquor, washing the solid oxidation product with water and benzene, drying the solid washed oxidation product, distilling the wash benzene to obtain a residue, recycling said residue to said mother liquor, adding make-up anhydrous alkali metal hydroxide thereto and continuing said oxidation.

2. The process of claim 1 wherein said anhydrous liquid phase mixture contains an inert reaction diluent.

3. The process of claim 2 wherein said diluent is selected from the group consisting of chlorobenzene, dichlorobenzene, bromobenzene, diphenyl, chlorotoluene, bromotoluene, nitrobenzene and chloronaphthalene.

4. The process of claim 1 wherein said anhydrous liquid phase mixture is prepared by azeotropically distilling water from a mixture containing concentrated aqueous alkali metal hydroxide, diisopropyl-benzene and a member selected from the group consisting of chlorobenzene, dichlorobenzene, bromobenzene, diphenyl, chlorotoluene, bromotoluene, nitrobenzene and chloronaphthalene.

References Cited

UNITED STATES PATENTS

| | | | |
|---|---|---|---|
| 2,548,435 | 4/1951 | Lorand et al. | 260—618 |
| 2,632,774 | 3/1953 | Conner et al. | 260—610 |
| 2,713,599 | 7/1955 | Lorand | 260—618 |
| 2,776,320 | 1/1957 | Hammond et al. | 260—610 |

BERNARD HELFIN, Primary Examiner